Dec. 15, 1942.    G. PAYNE    2,305,489
REDUCTION GEAR DEVICES FOR RADIO TUNERS
Filed Nov. 7, 1941    2 Sheets-Sheet 1
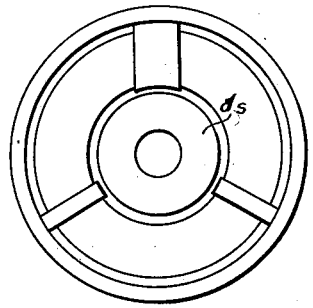
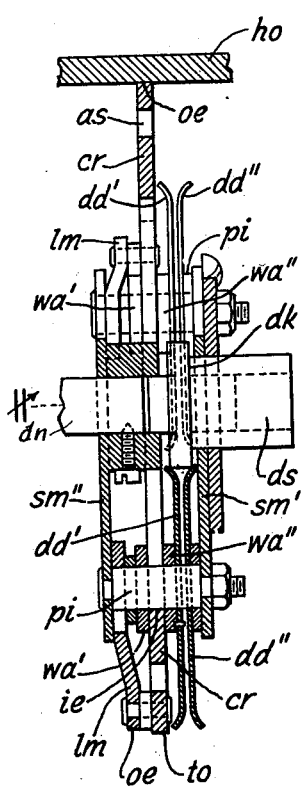
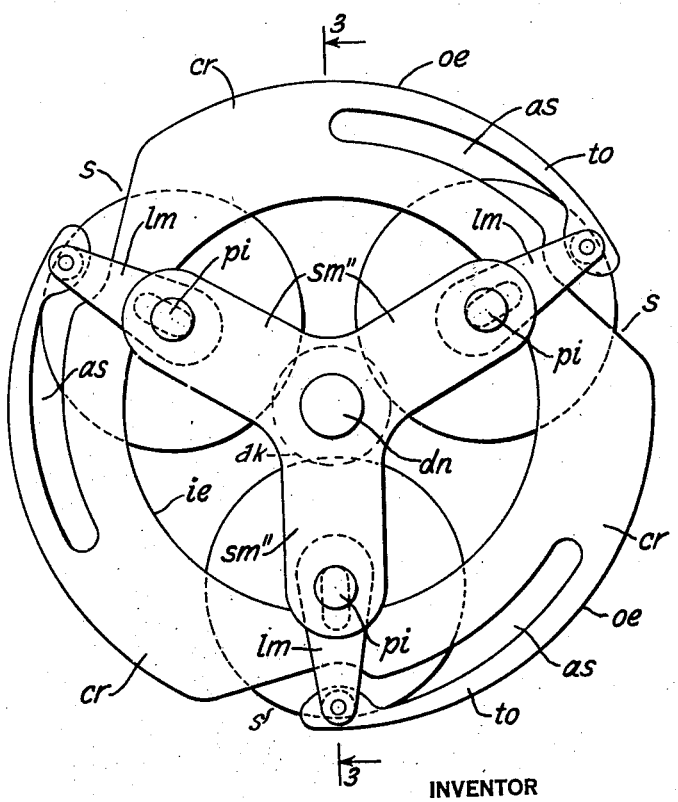
INVENTOR
GEOFFREY PAYNE
BY
ATTORNEY Dec. 15, 1942.                    G. PAYNE                    2,305,489
                    REDUCTION GEAR DEVICES FOR RADIO TUNERS
                    Filed Nov. 7, 1941            2 Sheets-Sheet 2

INVENTOR
GEOFFREY PAYNE
BY
ATTORNEY

Patented Dec. 15, 1942

2,305,489

UNITED STATES PATENT OFFICE 2,305,489

REDUCTION GEAR DEVICE FOR RADIO TUNERS

Geoffrey Payne, Chelmsford, England, assignor to Radio Corporation of America, a corporation of Delaware Application November 7, 1941, Serial No. 418,128
In Great Britain April 3, 1940

8 Claims. (Cl. 74—10)

The present invention relates to epicyclic reduction gear devices such as may be used, for example, in adjusting the tuning elements of radio apparatus; it may, of course, be used for other purposes.

In its broadest aspect the invention provides an improved reduction gear device, of the epicyclic gear type, in which, after a movement through the reduction gear, the reduction gear mechanism is put out of action and a direct drive is provided between the driving and driven members.

In a more restricted aspect, the invention provides means for effecting a coarse adjustment of an adjustable member by driving said adjustable member directly from a driving member and for effecting a fine adjustment of the adjustable member through the reduction gear, the change from coarse to fine adjustment being effected by reversing the direction of movement of the driving member. It will be seen that the coarse adjustment is an adjustment to a point beyond the desired point and that the fine adjustment is effected by reverse drive.

According to the invention, an epicyclic reduction gear includes a driving shaft and a driven shaft coaxial therewith, a driving wheel fixed coaxially to said driving shaft, a carrier member fixed to said driven shaft, a planet wheel carried by said carrier member adapted to engage said driving wheel, an annular member coaxial with said shafts adapted to be engaged by a member carried by said planet wheel, spring means associated with said annular member adapted to fix said annular member against rotation, and means associated with said driven shaft actuated upon rotation of said driven shaft through a predetermined angle to operate said spring means thereby to release for rotation said annular member.

Preferably the carrier member comprises a "spider" and the annular member comprises a flat ring having at least one spring which is loaded to have a radial component of movement whereby to engage a fixed housing for the gear assembly, link members serving to connect a limb of said carrier member with said spring means whereby to retract it from engagement with said housing.

Figure 4A:
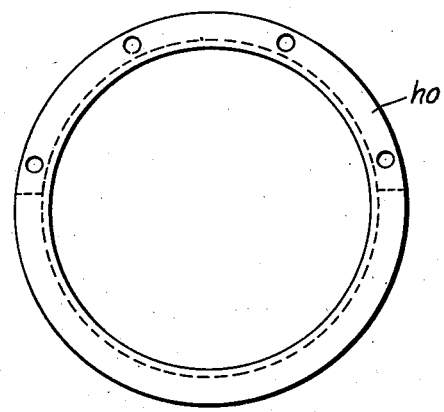
Figure 4B:
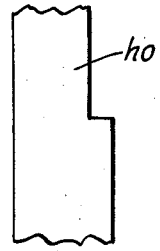
Figure 5:
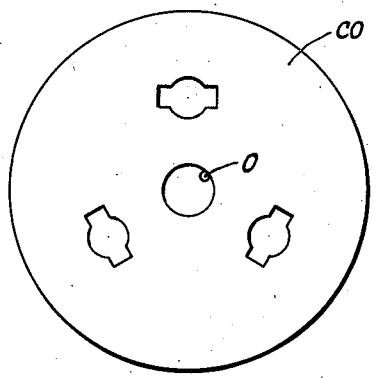
Figure 6:
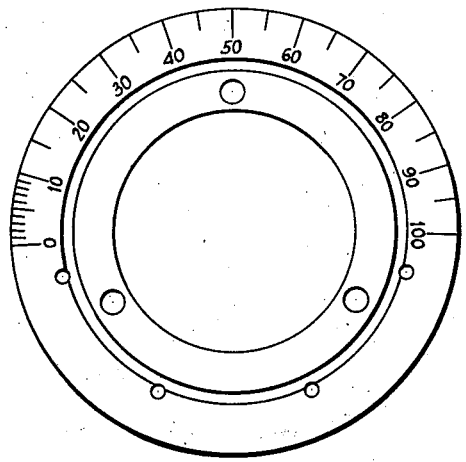

The invention will be further described in connection with the accompanying drawings which illustrate one way of carrying the invention into effect and in which Figure 1 is a front view of the adjusting knob for the gear reduction device; Figure 2 is a rear view of the gear reduction device; Figure 2a is a detailed view of one of the link members shown in Figure 2; Figure 3 is a view in cross-section taken on the line 3—3 and looking in the direction of the arrows; and Figures 4a, 5 and 6 are component parts of the housing for the gear reduction device, Figure 4a showing the cylindrical wall, and Figure 4b being a fragmentary view thereof; Figure 5 being a front view of the cover plate; and Figure 6 being a front view of the housing base. In the embodiment illustrated there is provided a shallow cylindrical housing $ho$ (Figures 3, 4a and 4b) of insulating material, this housing consisting of a base (Figure 6), a cover (Figure 5), and a shallow cylindrical wall (Figure 4a). Through an orifice $o$ in one end wall constituted by the cover $co$ of the housing extends a driving shaft $ds$ (Figure 3) having fixed thereon an adjusting handle or knob (Figure 1), the driving shaft $ds$ and the cylindrical housing being coaxial. Situated within the housing is a flat circular ring $cr$ having its inner and outer circular edges $ie$ and $oe$ coaxial with the shaft. This ring is provided with three slots $s$ which extend from the outer circular edge to about half-way across the width thereof, the slots being equally spaced around the ring and having a general direction of about 30° to a tangent of the said outer circular edge $oe$. All the slots extend in the same direction, into the material of the ring and each extends into an arcuate slot $as$. The three free tongues $to$ of metal thus formed constitute springs which by reason of their resilience, hold, by friction, the ring against rotation in the housing.

The driven shaft $dn$ is journalled to the driving shaft $ds$ for independent rotation thereof.

Freely mounted on the driving shaft is a three-armed spider member $sm'$, and fixedly mounted on the driven shaft is a similar member $sm''$, the three limbs of the two spiders extending radially from their respective shafts and being of like length one with another. A limb of one spider is connected to a limb of the other by means of a pin $pi$ and this applies to all limbs of either spider. The rear spider, as can be seen from Figure 2, is on one side of the plane in which the flat ring $cr$ lies, and the other is on the other side of the said plane, the pins joining the limbs of one spider therefore extending through the plane. The radial distances of the pins from the centres of rotation of the respective shafts are equal amongst themselves and are somewhat less than the radius of the aperture in the flat annular ring $cr$.

Also mounted on, or formed integral with, the driving shaft is a small disc *dk* which serves as a driving wheel for the epicyclic gear.

Mounted upon, as a pivot, each pin *pi* joining the limbs of the spiders, are two resilient dished discs *dd'* and *dd''* having their convex faces closely adjacent each other. Each pair of resilient dished discs constitutes a planet wheel and the two discs of a pair grip between them the small disc *dk* forming the driving wheel.

Also mounted upon each pin as a pivot, are two washers *wa'* and *wa''* positioned on their respective pins so as to tightly grip between them the inner edge *ie* of the flat ring *cr*. One of these washers *wa''* is attached to one of the resilient dished discs *dd'* for rotation therewith.

Attached to the end of each arm of one of the spiders, for example *sm''*, fixed to the driven shaft, is a link member *lm*. These link members may, conveniently, be attached by being fixed to the respective pins joining the spiders. The end of each link remote from that by which it is attached to the spider-assembly is attached to the free end of one of the tongues *to* forming part of the flat ring. The fixture of the links to the pins is effected through a slot *sl* (see Figure 2a) in the former, the length of which slot determines the range of the drive through the reduction gear.

There may be attached to one of the limbs of the spider a pointer (not shown) which extends through a slot in the housing and cooperates with a scale on the housing (see Figure 6). The manner in which the slot is formed will be seen from fragmentary sketch 4b.

The arrangement of the spider *sm''*, links *lm*, and tongues *to* is such that the spider rotates with that end of the links which is attached to its limb and after the spider shall have rotated through a predetermined angular distance, the links are picked up by the pins *pi*, and exert a pull upon the tongues *to* forming part of the flat ring.

Normally, that is, until the links exert the above mentioned pull upon the tongues, these tongues form a spring-grip hold upon the side of the housing (Figure 4a) so that the ring is held against rotation. In this condition, rotation of the driving shaft *ds* rotates the driving wheel *dk* attached to this shaft and this driving wheel drives by friction drive the three planet wheels constituted by *dd'* and *dd''*. The planet wheels, in rotating, rotate that one of the washers which is fixed to the planet, and so by friction cause the spider assembly on the driven shaft *dn* to rotate but at a slower speed than the speed of rotation of the driving shaft. When after the spider assembly shall have rotated through the above mentioned predetermined angular distance, the links exert their pull upon the tongues forming part of the flat ring, the tongues relax their spring grip hold upon the housing *ho* and the said flat ring *cr* is then free to rotate with and is rotated by the driving shaft, the epicyclic gear being put out of action and the driven shaft being driven without reduction of speed.

What I claim is:

1. An epicyclic reduction gear including a driving shaft and a driven shaft coaxial therewith, a driving wheel fixed coaxially to said driving shaft, a carrier member fixed to said driven shaft, a planet wheel carried by said carrier member adapted to engage said driving wheel, a driving disc associated with said planet wheel, an annular member coaxial with said shafts adapted to be engaged by said driving disc, spring means associated with said annular member adapted to fix said annular member against rotation, and means associated with said driven shaft actuated upon rotation of said driven shaft through a predetermined angle to operate said spring means thereby to release, for rotation, said annular member.

2. A reduction gear as claimed in claim 1 wherein the carrier member comprises a "spider" and the annular member comprises a flat ring having at least one spring, loaded to have a radial component of movement whereby to engage a fixed housing for the gear assembly.

3. A reduction gear as claimed in claim 1 wherein the carrier member is provided with at least one limb and said means associated with said driven shaft actuated upon rotation of said driven shaft comprises a link member serving to connect the limb of said carrier member with said spring means whereby to retract it from engagement with said housing.

4. A reduction gear as claimed in claim 1 wherein said annular member comprises a flat circular ring having its inner and outer circular edges coaxial with the shaft, said ring being provided with slots which extend from the outer circular edge to about half-way across the width thereof, the slots being equally spaced around the ring and all the slots extending in the same direction into the material of the ring and each extending into an arcuate slot whereby to form tongues of metal which constitute the said spring means.

5. A reduction gear as claimed in claim 1 wherein the carrier member is constituted by a three-armed spider member and a similar member is fixedly mounted on the driven shaft, the three limbs of the two spiders extending radially from their respective shafts and being of like length one with another.

6. A reduction gear as claimed in claim 1 wherein the carrier member is constituted by a three-armed spider member and a similar member is fixedly mounted on the driven shaft, the three limbs of the two spiders extending radially from their respective shafts and being of like length one with another, a pin acting as a pivot interconnecting corresponding limbs of the two spiders, and wherein there is mounted on or formed integral with the driving shaft a small disc which serves as a driving wheel for the epicyclic gear, and mounted upon each pin, are two resilient dished discs having their convex faces closely adjacent each other, each pair of resilient dished discs constituting a planet wheel and the two discs of a pair gripping between them the small disc forming the driving wheel.

7. A reduction gear as claimed in claim 1 wherein the carrier member is constituted by a three-armed spider member and a similar member is fixedly mounted on the driven shaft, the three limbs of the two spiders extending radially from their respective shafts and being of like length one with another, a pin acting as a pivot interconnecting corresponding limbs of the two spiders, and wherein there is mounted on or formed integral with the driving shaft a small disc which serves as a driving wheel for the epicyclic gear, and mounted upon each pin are two resilient dished discs having their convex faces closely adjacent each other, each pair of resilient dished discs constituting a planet wheel and the two discs of a pair gripping between them the small disc forming the driving wheel, and wherein there are mounted upon each pin, two washers positioned on their respective pins so as to tightly grip between them the inner edge of the annular member, one of these washers being attached to one of the resilient dished discs for rotation therewith.

8. In combination, a rotatable driving member, a driven member, means interposed between said members to drive said driven member at a speed lower than the speed of the driving member when the latter is rotated in one direction and to establish a direct drive connection between the driving and driven members when the driving member is rotated in the opposite direction, said means comprising a ring member provided on its outer periphery with spring means which normally engage the inner wall of a housing, a first carrier movable with said driven member positioned on one side of said ring member, a second carrier positioned on the other side of said ring member movable with said first carrier, pivot pins interconnecting said carriers, means carried by each of the pivot means adapted to be driven by the driving member, a pair of disc members carried by each of said pins, one on each side of the ring member, adapted to engage the inner periphery thereof, one of said disc members being rigidly affixed to the driven means carried by one of the pivot means, and means carried by the first carrier adapted to retract the spring means of the ring member to permit free rotation thereof.

GEOFFREY PAYNE.